United States Patent Office 3,416,558
Patented Dec. 17, 1968

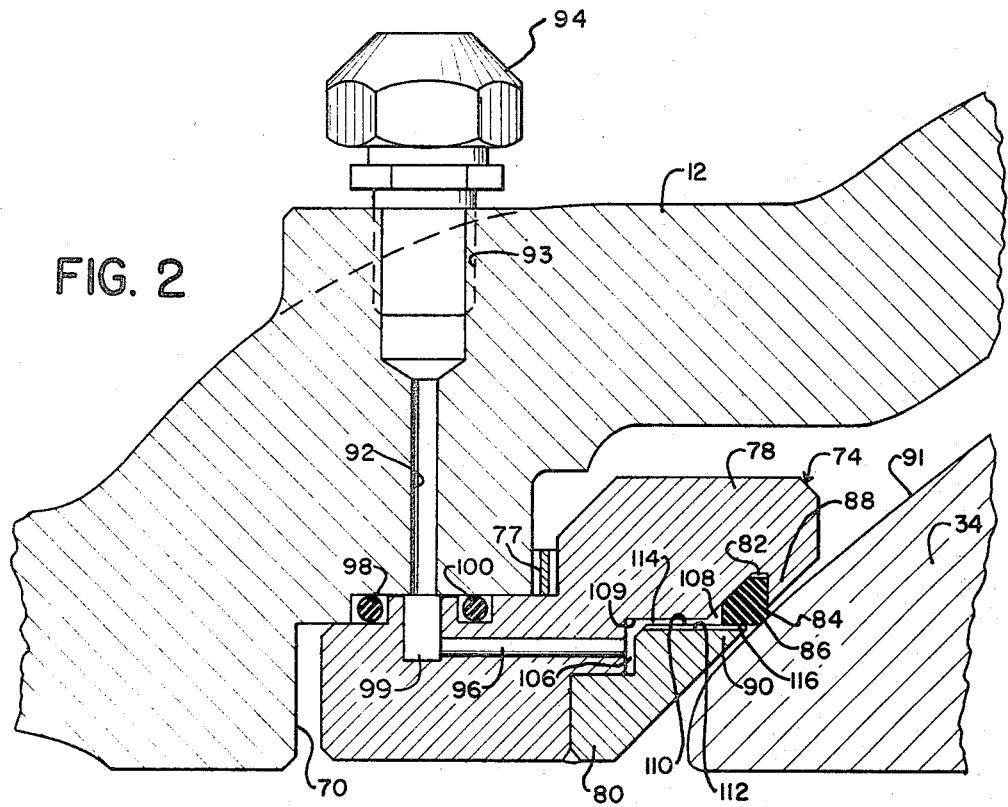

3,416,558
SPHERICAL PLUG VALVE HAVING
LUBRICATED SEATS
Madden T. Works, Houston, Tex., assignor to ACF Industries, Incorporated, New York, N.Y., a corporation of New Jersey
Filed Jan. 23, 1967, Ser. No. 610,906
12 Claims. (Cl. 137—246.22)

ABSTRACT OF THE DISCLOSURE

The valve of this invention incorporates movable seat members which are disposed in sealing engagement with the valve body and which carry an entrapped elastomeric sealing member for establishing sealing engagement between the seat member and the spherical plug. The valve is provided with a seat lubricating and sealing system, which evenly distributes lubricant material on the seat-to-plug working surfaces to provide for proper lubrication and to enhance the sealing ability of the valve.

*Field of the invention*

This invention relates generally to valves and more specifically to spherical plug valves having means for the introduction of lubricant material from the exterior of the valve to the spherical working surface of the plug to provide lubrication between the spherical plug and the seat members of the valve and to enhance the sealing ability of the valve.

Lubrication systems for valves are quite well-known in most of the numerous commercially available valve types. Lubrication systems, regardless of the type of valve, generally involve the provision of an external lubricant fitting and lubricant passages in the valve body to allow the injection of lubricant material into the valve. Depending upon the type of seat members employed in the valve, i.e., whether immovable or movable, there is generally provided a lubricant passage which introduces lubricant material to the valve element of the valve in the vicinity of contact between the valve element and the valve seat. In most lubricated valve applications, there is provided groove structure formed in the sealing face of the valve seat which receives lubricant from the lubricant passages or passage and which deposits lubricant material on the working surface of the valve member. The lubricant material, which frequently may be a viscous petroleum product or any one of a number of commercial available semi-solid plastic materials, generally serves a dual purpose of providing proper lubrication for the working surface of the valve member and enhancing the sealing ability of the seal between the working surface of the valve member and the seat member as well as the seal between the seat members and the valve body.

Lubricated spherical plug valves are frequently provided with a simple metal-to-metal seal between the seat members and the spherical working surface of the plug member. Lubricant material, which may also be referred to as sealant material, is introduced by means of external fittings and a lubrication system to grooves formed in the sealing face of the seat members or formed in the working surface of the spherical plug member to develop a positive seal between the metal sealing surfaces of the plug and the seat members.

Other lubricated valves utilize the lubricant material primarily for emergency sealing purposes. Prior Patent No. 3,078,865 illustrates a gate valve structure having movable seat members which are provided with a plastic insert for the establishment of a seal between the seat member and the working surface of the gate member. A lubricant or sealant system is provided for the introduction of semi-solid lubricant material to the working surface of the gate to provide for emergency sealing in the event of the development of leakage between the plastic insert and the working surface of the gate.

A problem of major importance concerns the ability of a sealant or lubricating system of a valve to assure complete and even distribution of the lubricant material about the sealing surfaces. It is obvious that the sealing ability of a valve can only be enhanced if the working surface of the valve element and the seat members are completely and evenly coated with a film of lubricant material. To provide for the introduction of the lubricant material to the working surface of the valve element, the seat members of the valve are generally provided with a plurality of spaced lubricant passages which generally communicate with an annular chamber or reservoir defined in the seat recesses about the valve seats. Some lubricated valves utilize a single lubricant passage to conduct lubricant material to a lubricant groove disposed at the sealing face of the valve or the seat member, while other valves may be provided with two to four lubricant passages, for example. The ability of the particular seat design to provide adequate lubricant distribution on the sealing surfaces depends upon a number of factors including the proximity of the lubricant outlet to the desired point of sealing, the type and viscosity of lubricant employed, and the operating temperature of the particular valve. Since it is impractical to machine closely lubricant passages in the valve seat because of the manufacturing costs involved, it has been extremely difficult to provide adequate lubrication and positive sealing ability without forcing a considerable amount of lubricant through the lubrication system of the valve. Difficulty of manufacturing also frequently dictates the deposit of lubricant material at locations spaced from the proper sealing area so that the lubricant may then be worked by valve movement to the location of desired sealing. Moreover, many undesirable conditions may be encountered if excessive amounts of lubricant are forced into the valve. For example, the particular fluid controlled by the valve may be subjected to contamination if excessive amounts of lubricant are utilized.

*Summary*

The instant invention therefore is directed to a lubricating or sealant system for spherical plug valves which positively insures even distribution of the sealing and lubricating material about the face sealing surfaces of the annular seat members and assures that the lubricant material is evenly distributed on the working surface of the spherical plug valve at the desired point of sealing. This is accomplished without involving the movement of a large amount of lubricant material. Proper lubrication and positive sealing is accomplished through the provision of seat assemblies having a retainer ring structure cooperating with an annular seat ring structure to define an annular groove having a restricted annular opening. An annular sealing member is retained within the annular groove and has a sealing portion thereof extending through the restricted opening and into sealing engagement with the spherical working surface of the plug. The annular sealing member and one wall defining the annular groove cooperate to prevent the development of a fluid tight seal between the sealing member and the wall and to define a plurality of small closely spaced lubricant passages extending to the sealing face of the seat member. Lubricant will be introduced through the plurality of small lubricant passages to the working surface of the plug valve at the contact point between the resilient sealing member and the working surface of the plug so that the lubricant material is immediately available for both sealing and lubrication, rather than requiring the necessity of being worked into the proper location as described above.

Accordingly, it is a primary object of the instant invention to provide a novel lubrication system for a spherical plug valve which insures even distribution of the sealant material on the working surface of the spherical plug valve at the desired point of sealing contact.

It is a further object of this invention to provide a novel lubrication system for a spherical plug valve construction wherein the lubricant system operates in conjunction with resilient sealing members to provide positive sealing ability under all conditions of valve operation.

It is an even further object of this invention to provide a novel lubricant system for a spherical plug valve which provides successive annular lubricant reservoirs and which cooperate one with the other and with a plurality of lubricant outlet passages to effect even distribution of lubricant material.

Among the objects of this invention is contemplated the provision of a novel lubrication system for spherical plug valves which provide for limited self relubrication to allow the valve to be operated a number of times without requiring manual relubrication thereof.

Other and further objects of this invention will become obvious upon an understanding of the illustrative embodiments about to be described or will be indicated in the appended claims, and various advantages not referred to herein will occur to one skilled in the art upon employments about to be described or will be indicated in the Preferred embodiments of the invention have been chosen for purpose of illustration and description and are shown in the accompanying drawings forming a part of the specification wherein:

FIGURE 2 is a fragmentary sectional view of the valve of FIGURE 1 illustrating the seat lubricating system of the valve in detail;

FIGURE 3 is an isometric view of the retainer ring structure of the seat assembly of FIGURE 2 illustrating the irregular exterior peripheral surface of the retainer ring;

FIGURE 4 is an expanded isometric view of a retainer ring and elastometric sealing ring relating to a modified embodiment of this invention.

Figure 1:
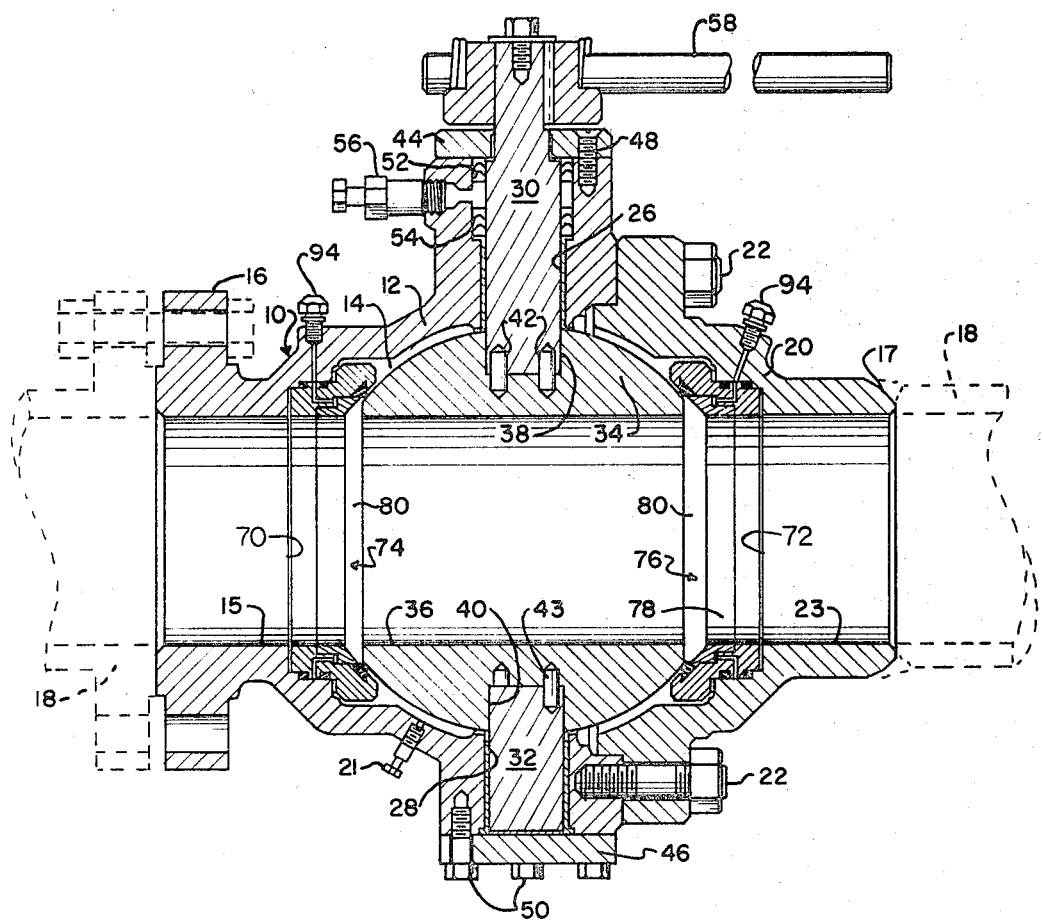
FIGURE 1 is an elevational view in section illustrating a spherical plug valve constructed in accordance with the spirit and scope of this invention.

Referring now to the drawings for a more complete understanding of the invention, a valve, which may be an end entry spherical plug valve as illustrated at 10 in FIGURE 1, has a valve body portion 12 thereof defining a valve chamber 14. The body portion 12 of the valve 10 is formed with a flow passage 15 in fluid communication with the valve chamber. The valve body may be provided with a flange structure as shown at 16 in FIGURE 1 or it may be provided with a weld end construction for either bolted or welded construction of the valve 10 to a pipeline 18. Other conventional methods of connection between the valve 10 and the pipeline 18, such as threaded connection, for example, may be employed without departing from the spirit or scope of this invention. And end closure portion 20 of the valve 10 is retained in sealed assembly with the valve body portion 12 by a series of bolts or threaded studs 22 and defines a closure for the valve chamber. The end closure member 20 is formed with a flow passage 23 which is disposed in axial alignment with the flow passage 15. The end closure member 20 may be provided with a weld end structure 17 for welded connection thereof to a pipeline 18; or other suitable connection structures may be employed within the spirit and scope of this invention. The valve body 12 may be provided with a pressure relief fitting 21 for bleeding body pressure to the atmosphere, if desired.

The valve body 12 is formed with aligned upper and lower bores 26 and 28, respectively, which receive upper and lower trunnioned members 30 and 32, respectively, therein. A spherical plug member 34 having a flow passage 36 formed therein is rotatably positioned within the valve chamber 14 and is provided with oppositively disposed generally cylindrical bores 38 and 40, which receive the inner extremities of the trunnions 30 and 32. The plug member 34 is maintained in nonrotatable relation with the upper trunnion 30 by a pair of pin members 42 which fit within mating bores formed in the plug and in the trunnion 30. A pin 43 maintains a nonrotatable relation between the lower trunnion 32 and the spherical plug 34. Upper and lower cap plates 44 and 46 are fixed to the valve body 12 by a series of bolts 48 and 50, respectively, and serve as axial thrust supports for the upper and lower trunnions 30 and 32.

An enlarged bore 52, formed in concentric relation with the bore 26 in the valve body 12, cooperates with the cylindrical surfaces of the upper trunnion member 30 to define an annular packing chamber. A packing assembly 54, disposed within the packing chamber, establishes a fluid tight seal between the trunnion 30 and the valve body 12.

A packing adjustment fitting 56 is fixed to the valve body and is disposed in fluid communication with the packing chamber. In the event of leakage of the packing assembly such as might be caused by wear, for example, semi-solid packing material such as plastic, heavy grease, or other packing sealants and lubricants may be forced into the packing chamber by manual adjustment of the fitting 56 to repressurize the packing and stop the leakage. A handle structure 58 is fixed to the uppermost portion of the upper trunnion 30 and is manually rotated to induce rotation to the spherical plug member for opening and closing the valve. The valve structure may also be provided with hydraulic or electrically driven operator structures for imparting rotation to the spherical plug of the valve.

As illustrated in FIGURE 1, and forming an important part of this invention, the valve body 12 of the valve 10 is formed with a pair of seat recesses 70 and 72 each having seat assembly structures 74 and 76, respectively, positioned therein. The seat assemblies are biased toward the spherical plug 34 by a spring means 77, illustrated in FIGURE 2 as a wave spring. As illustrated in the drawings, each of the seat assemblies 74 and 76 comprises a seat ring 78 and a retainer ring 80 which interfit and are interlocked such as by welding or the like to define an annular generally triangular shaped seat groove 82 illustrated in detail in FIGURE 2. A face sealing member 84 is disposed within the annular groove 82 with an annular sealing portion 86 thereof extending through a restricted annular opening defined by cooperating lips 88 and 90 formed on the seat ring 78 and retainer ring 80, respectively.

To provide for lubrication between the seat members and the spherical working surface 91 of the plug member 34 and to enhance the sealing ability of the valve, the valve body 12 is provided with a lubricant passage 92, the outer extremity of which is threaded at 93 to receive a lubricant injection member 94. The lubricant pasage 92 opens into the seat recess portion 70 of the valve body in a position opposite a circumferential groove 99 in the seat ring 80 so that a lubricant passage 96 formed in the seat ring 78 will be in fluid communication therewith. Sealing means which may be in the form of a pair of O-ring members 98 and 100, disposed on opposite sides of the area of lubricant passage communication, form circumferential fluid tight seals between the valve body and the seat member 78 to prevent the loss of lubricant around the ends of the seat assemblies. While the sealing members 98 and 100 may be in the form of axially spaced O-ring members, it is not intended to limit the invention to this specific construction.

The annular retainer member 80 interfits with the seat member 78 in such a manner as to define an inner annular lubricant distribution chamber 106 which is in fluid communication with the lubricant passage 96 in the seat ring 78. The annular face sealing member 84 interfits within the annular groove 82 in such a manner as to define a relatively small outer annular lubricant distribution chamber 108.

The restricted clearance between the circumferential surface of the retainer ring and the peripheral wall 109 of the seat recess causes the lubricant material to be evenly distributed about the lubricant distribution chamber 106 so that lubricant material flows evenly through the restricted clearance to the outer lubricant distribution chamber 108.

With reference particularly to FIGURE 3, the retainer member 80 is provided with an irregular exterior peripheral surface 110 defining a series of grooves 112. The grooves 112 may be generally parallel as illustrated in FIGURE 3, but it is not intended that the invention be limited thereto. The grooves 112 may be of any desired shape as long as they extend across the cylindrical surface 110. While the grooves 112 may be formed by any acceptable manufacturing process, it has been found that a knurling operation producing grooves in the order of 1/64 of an inch in depth on the exterior cylindrical surface 110 of the retainer member 80 produces good results without involving excessive manufacturing costs.

With the retainer member 80 retained in assembly with the seat ring 78, the grooves 112 form a plurality of closely spaced small lubricant passages with the annular face sealing member 84. These lubricant passages are in fluid communication with the lubricant distribution chambers 106 and 108 and thereby conduct lubricant material from the lubricant distribution chambers to the working surface 91 of the plug member 34. Since fluid communication between the lubricant distribution chamber 106 and 108 is accomplished by means of a restricted annular area 114 defined between the exterior peripheral surface 110 of the retainer member 80 and the radially adjacent cylindrical wall of the seat ring 78 as described above, the flow of lubricant through this restricted area will cause this lubricant within the distribution chamber 106 to become evenly distributed therein. There is provided therefore an annular reservoir of lubricant from which the lubricant material can flow in an evenly distributed uniform manner between the chambers 106 and 108. The face sealing member 84, however, interfits with the exterior peripheral surface of the retainer member 80 in such a manner that the grooves 112 cooperate with the cylindrical inner peripheral surface of the sealing member 84 to define a plurality of small relatively short lubricant passages 116. The lubricant material within the outer lubricant distribution chamber 108 is extruded through the small lubricant passages 116 onto the working surface 91 of the spherical plug 34, at the inner peripheral surface of the sealing member 84.

The closely spaced small lubricant passages 116 function in cooperation with the successive lubricant distribution chambers 106 and 108 to effect an even deposit of lubricant material at the precise location required to effect proper lubrication and to enhance sealing between the plug member and seat members.

The face sealing member 84 and the lubricant extruded through the small lubricant passages 116 function in cooperation to achieve a positive full range sealing ability at all times. Through cooperation of the lubricant material and the face sealing member 84, a fluid tight seal will be maintained even though the face sealing member may become worn or damaged.

Referring now to FIGURE 4 of the drawings, a retainer member and a sealing member of a modified embodiment of the invention is illustrated in an exploded isometric view shown in partial section. A retainer member 120 having a smooth cylindrical exterior peripheral surface 122, and being of generally identical dimensions as compared with the retainer ring 80, interfits with a seat ring 78 in the same manner as shown in FIGURE 2. An annular elastomeric face sealing member 124 is formed of the same generally triangular cross sectional shape as the face sealing member 84, but it is provided with a plurality of grooves disposed about the internal peripheral surface thereof. The face sealing member 124 interfits with the smooth external cylindrical surface 122 of the retainer ring 120 in such a manner that the small grooves 126 cooperate with the generally cylindrical surface 122 to define a plurality of small closely spaced lubricant passages. These small lubricant passages function in the same manner as discussed above in regard to the lubricant passages 116 to conduct lubricant material from the outer lubricant distribution chamber 108 to the spherical working surface of the plug valve 34 and to deposit the lubricant on the working surface at the inner peripheral surface of the face sealing member to aid in effecting a fluid tight seal and to assure properly lubrication of the plug member and seat member for torque reduction.

Both of the seat constructions illustrated in FIGURES 2 and 4 will function in the same manner when disposed within the seat recesses of a spherical plug valve. The upstream seat member will be pressure actuated into tight sealing engagement with the spherical working surface of the plug valve 34 in a manner well-known in the art. The downstream seat member will not be subject to pressure actuation. It is not intended to limit the invention to valves having only a pressure actuated upstream seat however. The invention may be readily incorporated into valves having double acting seats where both the upstream and downstream seats are subject to pressure actuation by line pressure. The seat members may also be pressure actuated into sealing engagement with the plug by the lubricant material injected through the valve seat. Lubricant material under pressure between the O-rings 98 and 100 tends to actuate the seat member toward the plug member. Pressure actuation of the seat members will be temporary, however, because part of the lubricant material in time will be forced from the lubricant system through the small lubricant passages 116 causing the fluid pressure within the lubricant system to substantially equalize with line pressure within the valve. As discussed above, movement of the seat assemblies into sealing engagement with the plug member is also aided by the wave spring plug structure 77 illustrated in FIGURE 2.

The pressure of the fluid controlled by the valve will aid in lubrication of the upstream and downstream seat assemblies to a limited degree determined by the size of the recesses for the O-ring members 98 and 100. As the valve is lubricated by injecting lubricant material through the lubricant fitting 94 to the lubricant passage 92, the O-ring members 98 and 100 will be forced in opposite directions to the outer extent of their respective grooves in relation to the lubrication system. Fluid pressure within the lubricant system will simultaneously pressure actuate the seat assembly 78 toward the spherical plug 34 in the manner described above. As lubricant material becomes extruded out of the lubrication system through the lubricant passages 116, line pressure from the valve will force the O-ring member 98 toward the O-ring member 100, thereby causing lubricant material to be forced past the face sealing member onto the spherical working surface of the plug by way of the lubricant passages 116. This feature enables the valve to be opened and closed several times without requiring relubrication.

It will be evident from the foregoing that I have provided a unique spherical plug valve construction which is adapted for full range valve application, i.e., adapted for both low and high pressure valve service. The invention effectively utilizes the preferable sealing qualities of elastomeric material for the achievement of a positive fluid tight seal between the spherical working surface of the plug member and the seat member under both low pressure and high pressure conditions of operation. The valve of my invention is provided with movable seat members having a lubrication system therefor which forces the seat toward the plug and conducts lubricant materials to the area of the face seal to augment the sealing ability of the valve and to provide lubrication for low torque operation. The novel lubricant system of my invention effectively promotes the injection of an evenly distributed amount of lubricant material at the point of desired lubrication and sealing, therefore eliminating the lubricant distribution disadvantages referred to hereinabove in regard to other lubricated valves. The lubricant system of my invention functions effectively to cause lubricant material to cooperate with the elastomer face sealing member and achieve a positive fluid tight seal at all pressure conditions even though the face sealing member may be worn or damaged. A valve constructed in accordance with the spirit and scope of my invention inherently remains functional for long periods of time under severe operating conditions without requiring maintenance other than periodic injection of lubricant into the lubrication system. Therefore it is seen that this invention is one well adapted to obtain all of the objects herein above set forth together with other advantages which become obvious and inherent from the description from the apparatus itself. It will be understood that certain combinations and subcombinations are of utility and may be employed without reference to other features and subcombinations.

This is contemplated by and is within the scope of the claims. As many possible embodiments may be made of the invention without departing from the spirit or scope thereof. It is to be understood that all matters hereinabove set forth or as shown in the accompanying drawings are to be interpreted as illustrative and not in a limiting sense.

I claim:

1. A spherical plug valve comprising a valve body defining a generally spherical valve chamber, said valve body having inlet and outlet passages disposed in fluid communication with said valve chamber, a spherical plug member disposed within said valve chamber and having a flow passage therein for alignment wtih said inlet and outlet passages in the open position of said valve, means for imparting rotation to said plug member between the open and closed positions thereof, at least one seat recess formed in said valve body about said flow passage, a seat assembly including a seat ring movably disposed in said seat recess, a retainer ring interfitting with said seat ring and defining therewith an annular groove having a restricted annular opening, an annular resilient face sealing member disposed within said groove and having an annular sealing portion thereof protruding through said restricted opening for sealing engagement with said spherical plug, a lubricant injection device carried by said valve body, first lubricant passage means formed in said valve body and being in fluid communication with said lubricant injection device, second lubricant passage means formed in said seat ring and being in fluid communication with said annular groove, means establishing seals between said seat ring and said valve body and defining a lubricant chamber, said first and second passages being in fluid communication with said lubricant chamber, means preventing the development of a seal between said face sealing member and said retainer member, whereby lubricant from said second lubricant passage will be extruded past said face sealing member onto said spherical plug member to reduce friction between said spherical plug and said seat assembly and to enhance the sealing ability of said face sealing member.

2. A spherical plug valve as set forth in claim 1, said means preventing the development of a seal between said retainer member and said face sealing member comprising a plurality of closely spaced grooves formed in the surface of said retainer ring, said closely spaced grooves cooperating with said face sealing member to define a plurality of closely spaced small lubricant passages, said small lubricant passages conducting lubricant to said plug member.

3. A spherical plug valve as set forth in claim 2, said seat assembly defining lubricant distribution means for effecting even distribution of lubricant material, said closely spaced lubricant passages being in fluid communication with said lubricant distribution means, whereby said spaced lubricant passages transport lubricant from said lubricant distribution means to said spherical plug member.

4. A spherical plug valve as set forth in claim 3, said lubricant distribution means comprising spaced annular lubricant distribution chambers defined in said valve seat, an annular restricted passage defining fluid communication between said spaced annular chambers, said annular restricted passage cooperating with said spaced annular chambers to achieve an even distribution of lubricant in said spaced annular chambers.

5. A spherical plug valve as set forth in claim 1, said means preventing the development of a seal between said retainer member and said face sealing member comprising a plurality of grooves formed in the interior peripheral surface of said face sealing member, said retainer member having a general cylindrical exterior peripheral surface cooperating with said plurality of grooves to define a plurality of passages for conducting lubricant to said spherical plug member.

6. A spherical plug valve as set forth in claim 5, said seat member and retainer member cooperating to define annular lubricant distribution means for effecting even distribution of lubricant material, said lubricant distribution means being in fluid communication with said second lubricant passage means, said plurality of passages being in fluid communication with said lubricant distribution means.

7. A spherical plug valve as set forth in claim 6, said plurality of lubricant passages being generally parallel and being disposed about the entire inner periphery of said sealing ring.

8. A lubricated seat assembly for a lubricated valve comprising a seat ring having at least one lubricant passage communicating with a source of lubricant material provided in said valve, a retainer ring interfitting with said seat ring to define an annular face seal groove having an annular restricted opening, an annular resilient face sealing member disposed within said face seal groove and having a sealing portion thereof protruding from said groove for sealing engagement with the working surface of the valve member of said valve, said seat ring, said retainer ring and said face sealing member defining a lubricant distribution system in fluid communication with said lubricant passage, means preventing sealing engagement between the face sealing member and said retainer ring whereby lubricant material may be extruded past said face sealing member onto said working surface at the point of contact between said face sealing member and said working surface.

9. A lubricated seat assembly for a lubricated valve as set forth in claim 8, said means for preventing sealing engagement between said face sealing member and said retainer member comprising a plurality of grooves formed in the exterior peripheral surface of said retainer ring, said plurality of grooves cooperating with said face sealing member to define a plurality of lubricant passages disposed in spaced relation about said face sealing member, said plurality of lubricant passages being in fluid communication with said lubricant distribution chamber and conducting lubricant material from said lubricant distribution means to said working surface.

10. A lubricated seat assembly for a lubricated valve as set forth in claim 8, said means for preventing sealing engagement between said face sealing member and said retainer ring comprising a generally cylindrical outer peripheral surface formed on said retainer ring, a plurality of grooves formed in the inner periphery of said face sealing member, said plurality of grooves cooperating with said cylindrical surface to define a plurality of lubricant passages spaced about said retainer ring and being in fluid communication with said lubricant distribution system.

11. A lubricated seat assembly for a lubricated valve as set forth in claim 8, said annular face seal groove being generally triangular in cross section, said face sealing member being generally triangular in cross section and defining a generally cylindrical inner peripheral surface in engagement with said retainer ring.

12. A lubricated seat assembly for a lubricated valve as set forth in claim 8, said lubricant distribution means comprising inner and outer spaced annular lubricant chambers defined by said seat ring and retainer ring, an annular restricted passage defined by said seat ring and retainer ring establishing fluid communication between said inner and outer lubricant chambers, said inner chamber being in fluid communication with said lubricant passage, a plurality of lubricant passages defined about said retainer ring and being in fluid communication with said outer lubricant chamber.

References Cited

UNITED STATES PATENTS

| | | | |
|---|---|---|---|
| 2,890,017 | 6/1959 | Shafer | 251—174 |
| 3,890,017 | 6/1959 | Shafer | 251—174 |
| 3,214,135 | 10/1965 | Hartmann | 251—315 |
| 3,306,315 | 2/1967 | Cook | 137—246.22 |
| 3,315,697 | 4/1967 | Oliver | 137—246.22 |

LEONARD D. CHRISTIAN, *Primary Examiner.*

U.S. Cl. X.R.

251—172, 174, 315